United States Patent
Byun et al.

(10) Patent No.: US 9,541,964 B2
(45) Date of Patent: Jan. 10, 2017

(54) IMAGE MODULE, MOBILE TERMINAL HAVING THE SAME AND MANUFACTURING METHOD OF IMAGE MODULE

(71) Applicants: Huiseob Byun, Seoul (KR); Kyewon Chang, Busan (KR); Minseok Kim, Seoul (KR)

(72) Inventors: Huiseob Byun, Seoul (KR); Kyewon Chang, Busan (KR); Minseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 283 days.

(21) Appl. No.: 13/646,213

(22) Filed: Oct. 5, 2012

(65) Prior Publication Data
US 2013/0176241 A1    Jul. 11, 2013

(30) Foreign Application Priority Data

Jan. 10, 2012   (KR) .......................... 10-2012-0003003
Jan. 10, 2012   (KR) .......................... 10-2012-0003004

(51) Int. Cl.
| G06F 3/0488 | (2013.01) |
| G06F 3/044 | (2006.01) |
| G06F 3/045 | (2006.01) |
| G06F 1/16 | (2006.01) |

(52) U.S. Cl.
CPC ............. *G06F 1/169* (2013.01); *G06F 1/1626* (2013.01)

(58) Field of Classification Search
None
See application file for complete search history.

(56) References Cited

U.S. PATENT DOCUMENTS

| 5,816,677 | A | * | 10/1998 | Kurematsu | ............... F21V 5/02 |
| | | | | | 362/23.13 |
| 6,113,149 | A | * | 9/2000 | Dukatz | ................. B42D 15/00 |
| | | | | | 283/109 |
| 7,534,642 | B2 | * | 5/2009 | Choi | ............................... 438/57 |
| 2008/0286661 | A1 | * | 11/2008 | Misaka | ............................. 430/5 |
| 2011/0226595 | A1 | | 9/2011 | Arai et al. | |

FOREIGN PATENT DOCUMENTS

| JP | 2007-163760 A | 6/2007 |
| JP | 2008-261982 A | 10/2008 |
| JP | 2010-129318 A | 6/2010 |
| JP | 2010-250314 A | 11/2010 |

* cited by examiner

*Primary Examiner* — Jason Olson
*Assistant Examiner* — Parul Gupta
(74) *Attorney, Agent, or Firm* — Birch, Stewart, Kolasch & Birch, LLP

(57) ABSTRACT

An image module including a base member including a light transmissive material; a first layer having a first protruding pattern protruding from a first surface of the base member; a second layer including an opaque material and covering a second surface of the base member; and one or more image through-holes in the second layer and configured to pass light from a light source through the image through-holes and towards the protruding pattern to form one or more images.

8 Claims, 12 Drawing Sheets

PRINTING

ETCHING (REMOVING IMAGES
FROM EVAPORATEDSURFACE)

IMPLEMENTATION OF
IMAGE COLOR

SECONDARY ETCHING

PRINTING FOR ENHANCED
RELIABILITY

CUTTING

IMAGE MODULE, MOBILE TERMINAL HAVING THE SAME AND MANUFACTURING METHOD OF IMAGE MODULE

CROSS-REFERENCE TO RELATED APPLICATION

This application claims the benefit of priority of Korean Patent Application No. 10-2012-0003003 and Korean Patent Application No. 10-2012-0003004, both filed on Jan. 10, 2012, and both of which are herein expressly incorporated by reference herein in their entireties.

BACKGROUND OF THE INVENTION

1. Field of the Invention

The present disclosure relates to a mobile terminal, and more particularly, to an image module for implementing one or more images exposed to the outside of a mobile terminal, a mobile terminal having the same, and a manufacturing method of the image module.

2. Background of the Invention

In general, a terminal may be classified into a mobile (portable) terminal and a stationary terminal. The mobile terminal may be also classified into a handheld terminal and a vehicle mount terminal.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device using hardware or software. As an example of such efforts, research on implementing images such as icons or logos on the mobile terminal is ongoing. However, there is the following problem. That is, icons of a user input unit, logos of a case, etc. are not easily implemented by any methods rather than printing.

SUMMARY OF THE INVENTION

Therefore, an object of the detailed description is to provide a mobile terminal having an image of an improved design.

Another object of the detailed description is to implement an image of a new texture in a different manner from the related art.

Still another object of the detailed description is to provide a mobile terminal having an icon or a logo of a different design from that of the related art.

Yet still another object of the detailed description is to implement a mechanism where an icon or a logo which can be illuminated on a region of a mobile terminal, the region having a metallic texture.

To achieve these and other advantages and in accordance with the purpose of this specification, as embodied and broadly described herein, there is provided an image module, comprising: a base member formed of light transmissive material; a first layer protruding from one surface of the base member, and formed of light transmissive material so as to form one or more transparent images; a second layer formed of opaque material, and configured to cover another surface of the base member; and one or more image holes formed by removing parts corresponding to the images from the second layer, such that light which is towards said another surface illuminates the images through the base member.

According to an embodiment of the image module, the image may be formed on said one surface in three dimensions, thus to form an icon or a logo. Here, the image may be formed of the light transmissive material in a 3D manner, by using at least one of UV molding, NCVM (Non-Conductive Vacuum Metallization), multi-evaporation, gas phase deposition and digital printing.

According to an embodiment of the image module, the first layer may further include patterns protruding from said one surface of the base member, the patterns formed of light transmissive material in a different shape from that of the images. The images may be disposed within a region defined by the patterns. The patterns and the images may be formed of the same material.

According to an embodiment of the image module, the second layer may be formed of metallic material or mirror ink, such that light incident through said one surface is reflected.

According to an embodiment of the image module, the image holes may be formed by etching the second layer. A printing layer may be formed on one surface of the second layer except for parts corresponding to the images, such that a shape of the image holes is set by said etching.

According to an embodiment of the image module, the image module may include a third layer disposed to cover the second layer, and having a texture or a color so as to provide the texture or the color to the image. The third layer may include metallic material so as to provide a metallic texture to the image. A protection layer may be formed on one surface of the third layer for prevention of separation of the third layer.

To achieve these and other advantages and in accordance with the purpose of this specification, as embodied and broadly described herein, there is also provided a mobile terminal, comprising: a terminal body having a front surface and a rear surface; a transmissive region formed on at least one of the front surface and the rear surface; an image module mounted in the terminal body, and disposed such that at least part thereof is exposed to the outside through the transmissive region; and an optical source configured to generate light which is towards the image module, wherein the image module includes: a base member formed of light transmissive material; a first layer protruding from one surface of the base member, and formed of light transmissive material so as to form one or more transparent images; a second layer formed of opaque material, and configured to cover another surface of the base member; and one or more image holes formed by removing parts corresponding to the images from the second layer, such that light which is towards said another surface illuminates the images through the base member.

According to an embodiment of the mobile terminal, the mobile terminal may further comprise a touch sensor overlapping the image module, and configured to sense a touch input. The images may be illuminated on the front surface of the terminal body by light, and may form an icon associated with the touch input. A window may be mounted on the front surface, and the touch sensor and the image module may be sequentially formed on the window.

According to an embodiment of the mobile terminal, the image may form a logo illuminated by light, on at least one of the front and rear surfaces.

To achieve these and other advantages and in accordance with the purpose of this specification, as embodied and broadly described herein, there is still also provided a method for manufacturing an image module, the image module mounted to a mobile terminal and providing an image exposed to the outside of the mobile terminal, the method comprising: a first layer forming step of forming a first layer disposed on one surface of a base member, the first layer formed of transmissive material so as to form one or more transmissive images; a second layer forming step of forming a second layer formed of opaque material, on another surface of the base member; and a removing step of removing part corresponding to the image from the second layer, such that light which is towards said another surface illuminates the images through the base member.

According to an embodiment of the method for manufacturing an image module, the images may be formed on one surface of the base member, by using at least one of UV molding, silicone molding, NCVM (Non-Conductive Vacuum Metallization), multi-evaporation, gas phase deposition and digital printing. In the first layer forming step, patterns formed of light transmissive material in a different shape from that of the images, may be formed together with the images by said UV molding.

According to an embodiment of the method for manufacturing an image module, the second layer forming step may be a step of coating or evaporating metallic material on another surface of the base member, or a step of applying mirror ink onto said another surface of the base member.

The removing step may include a step of printing a print layer onto the second layer, the print layer formed on the second layer 243 except for parts corresponding to the images; and a step of etching parts corresponding to the images, from the second layer, using at least one of photo-etching, chemical etching and laser etching.

According to an embodiment of the method for manufacturing an image module, the method may further comprise a third layer forming step of forming a third layer so as to cover the second layer, such that the images have a texture or a color; and a protection layer forming step of forming a protection layer on one surface of the third layer for prevention of separation of the third layer.

A mobile terminal according to another embodiment of the present invention may comprise: a terminal body having an optical source; a touch sensor mounted to the terminal body, and configured to sense a touch input; and an image module overlapping the touch sensor, and providing one or more icons corresponding to the touch input, wherein the image module includes: a first layer formed of light transmissive material, and having one or more images and patterns of the icon; a second layer overlapping the first layer so as to cover the pattern; and one or more image holes formed by removing parts corresponding to the images from the second layer, such that light from the optical source illuminates the images.

According to an embodiment of the present invention, the first layer may be disposed on one surface of the base member which is formed of light transmissive material, and the second layer may be disposed on another surface of the base member. The image module may further include a third layer. The third layer may overlap the second layer on said another surface of the base member, and may have a texture or a color so as to provide the texture or the color to the image.

According to an embodiment of the present invention, a window may be mounted to the front surface of the terminal body, and a touch manipulation unit may be disposed on the window. A transmissive region may be formed on the touch manipulation unit, and the image module may be disposed on the transmisssive region. And, the mobile terminal may further comprise a lighting guide film formed to cover the touch manipulation unit, such that light from the optical source is towards the image module.

According to an embodiment of the present invention, a window may be mounted on the front surface of the terminal body, and the touch sensor and the image module may be sequentially formed on the window.

The touch sensor may include a transmissive touch film mounted to a rear surface of the window, and the image module may be attached to the transmissive touch film.

The touch sensor may include a touch sensing pattern of the window, and the image module may be attached to a rear surface of the window.

According to an embodiment of the present invention, a window may be mounted to the front surface of the terminal body, and the image module may be disposed between the window and the touch sensor.

The touch sensor may include a transmissive touch film, the image module may be mounted to a rear surface of the window, and the transmissive touch film may be attached to a rear surface of the image module.

The touch sensor may be formed of opaque material, and the image module may be disposed between the window and the touch sensor.

According to an embodiment of the present invention, a window may be mounted on the front surface of the terminal body, and the image module may be mounted to a rear surface of the window. And, the touch sensor may be formed on the surface of a display covered by the window.

According to an embodiment of the present invention, a window may be mounted on the front surface of the terminal body, and the second layer may be formed of light transmissive material on a rear surface of the window. The first layer may be formed on the second layer. And, the image module may further include a third layer overlapping the first layer on the rear surface of the window, the third layer having a texture or a color so as to provide the texture or the color to the image.

According to an embodiment of the present invention, the image module may be formed to be integral with a lighting guide film mounted in the terminal body so as to reflect the light towards the image. And, the first and second layers may be formed on one surface of the lighting guide film.

According to another aspect of the present invention, there is provided a mobile terminal, comprising: a terminal body having a front surface and a rear surface; a transmissive region formed on at least one of the front surface and the rear surface; an image module mounted in the terminal body, and disposed such that at least part thereof is exposed to the outside through the transmissive region; and an optical source configured to generate light which is irradiated towards the image module, wherein the image module includes: a first layer formed, by UV molding, such that one or more images are disposed within a region formed by transmissive patterns; and a second layer formed by printing opaque material such that the patterns have a texture and a color, and the second layer having parts corresponding to the images removed by etching such that light from the optical source illuminates the images.

The patterns and the images may be formed to have a height difference from each other in a thickness direction of the image module. The patterns may be formed such that a plurality of protrusion lines are repeatedly formed, and the image may implement a shape line of a logo or an icon. And, the patterns may be formed to fill other parts of the transmissive region rather than the shape line.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. A singular expression includes plural concepts unless there is a contextually distinctive difference therebetween.

A mobile terminal according to the present disclosure may include a portable phone, a smart phone, a laptop computer, a digital broadcasting terminal, Personal Digital Assistants (PDA), Portable Multimedia Player (PMP), a navigation system, etc. However, it will be obvious to those skilled in the art that the present disclosure may be also applicable to a fixed terminal such as a digital TV and a desktop computer.

Figure 1:
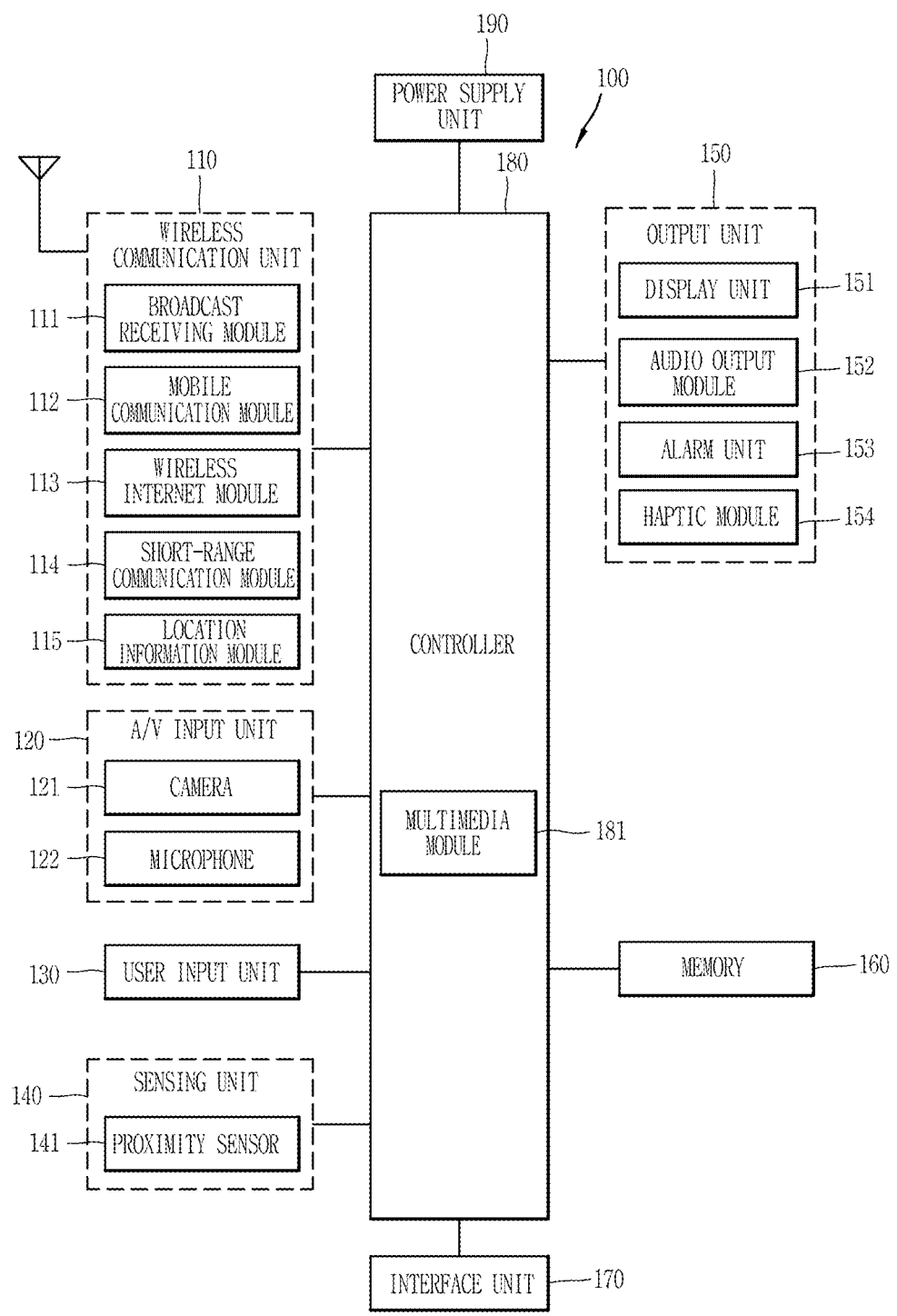
FIG. 1 is a block diagram of a mobile terminal according to one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the NV input unit 120 is configured to receive an audio or video signal. The NV input unit 120 may include a camera 121, a microphone 122 or the like. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of display units may be arranged on one surface integrally or separately, or may be arranged on different surfaces.

Here, if the display unit 151 and a touch sensitive sensor (referred to as a touch sensor) have a layered structure therebetween, the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, the proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image. The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
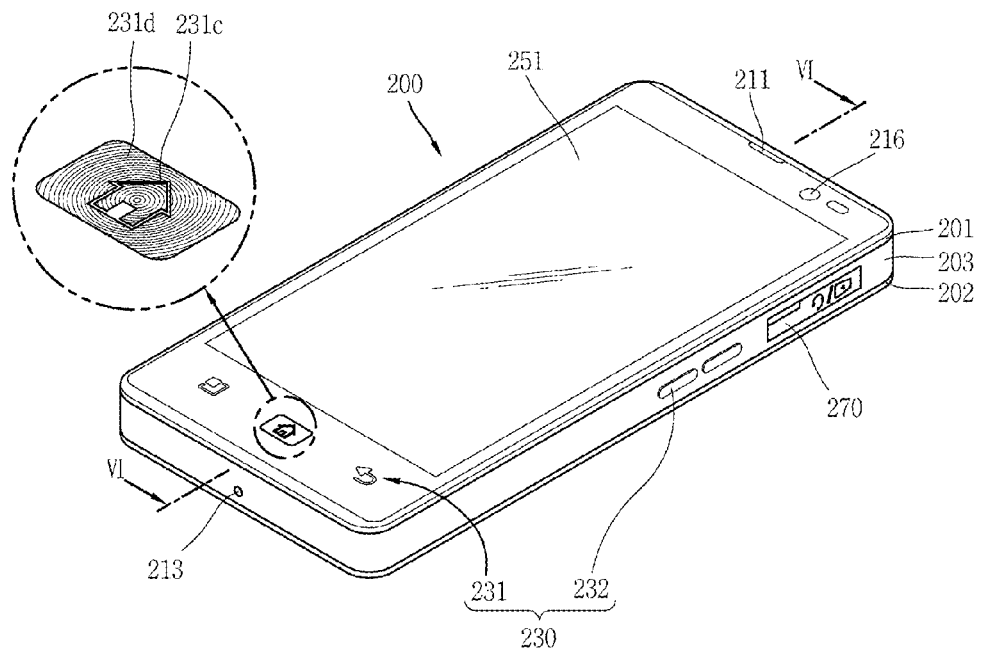
FIG. 2 is a front perspective view of a mobile terminal according to an embodiment of the present invention.
Figure 3:
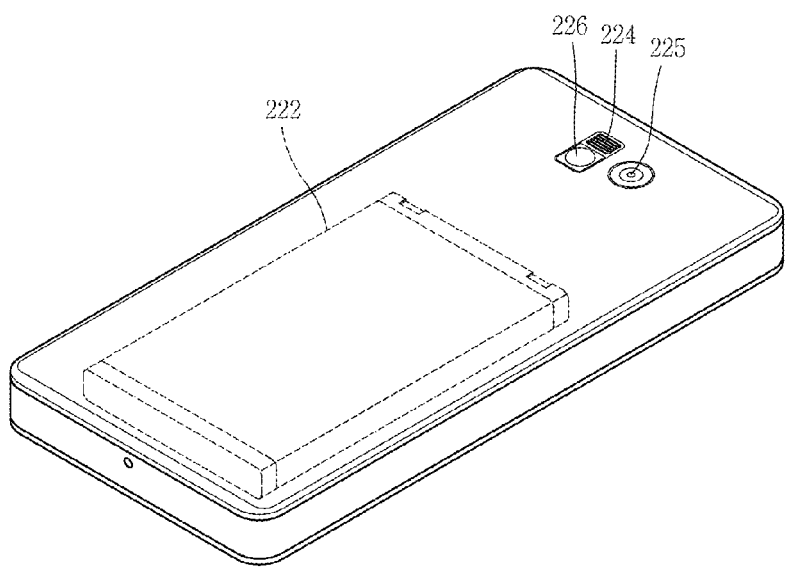
FIG. 3 is a rear perspective view of the mobile terminal of FIG. 2.

FIG. 2 is a front perspective view of the mobile terminal according to one embodiment of the present invention, and FIG. 3 is a rear perspective view of the mobile terminal of FIG. 2.

Referring to FIGS. 1 to 3, the mobile terminal according to an embodiment of the present disclosure is a bar type mobile terminal. However, the present disclosure is not limited to this, and may be applied to a slide type in which two or more bodies are coupled to each other so as to perform a relative motion, a folder type, or a swing type, a swivel type and the like. Furthermore, the mobile terminal of the present invention may be also applied to any portable electronic devices, e.g., a portable phone, a smart phone, a notebook computer, a tablet computer, a digital broadcasting terminal, Personal Digital Assistants (PDA), Portable Multimedia Player (PMP), etc.

As shown in FIG. 2, a mobile terminal 200 includes a case (casing, housing, cover, etc.) forming an outer appearance of a body. The casing may include a front case 201 and a rear case 202. A space formed by the front case 201 and the rear case 202 may accommodate various components therein. Such cases may be formed by injection-molded synthetic resin, or may be formed using a metallic material such as stainless steel (STS) or titanium (Ti). A middle frame 203 is also shown.

On the front case 201, may be disposed a display unit 251, a first audio output unit 211, a front camera unit 216, a user input unit 230, etc. On the side surface of the mobile terminal, an audio input unit 213, an interface unit 270, etc. may be disposed.

The display unit 251 includes a liquid crystal display (LCD) module for visually displaying information, an organic light emitting diodes (OLED) module, e-paper, etc. The display unit 251 may include a touch sensing means for sensing information input in a touch manner. Once a point on the display unit 251 is touched, information corresponding to the touched point is input. The information input in a touch manner may include texts, numbers, menu items which can be instructed or set in each mode, etc. The touch sensing means is formed to be transparent such that the display unit can be viewed, and may include a structure for enhancing visibility of a touch screen at a bright place. Referring to FIG. 2, the display unit 251 occupies most parts of a front surface of the front case 201.

The first audio output unit 211 may be implemented as a receiver for transmitting a call sound to a user's ears, or a loud speaker for outputting each type of alarm sounds or a reproduction sound of multimedia. Further, the front camera unit 216 processes image frames of still images or moving images obtained by an image sensor, in a call mode or a capturing mode. The processed image frames can be displayed on the display unit 251.

Referring to FIG. 3, a rear camera unit 225 and a power supply unit 222 are disposed on the rear surface of the body. The rear camera unit 225 may have a capturing direction opposite to that of the front camera unit 216, and may have different pixels from those of the front camera unit 216.

For example, the front camera unit 216 may operate with relatively lower pixels (lower resolution). Thus, the front camera unit 216 may be useful when a user can capture his face and send it to another party during a video call or the like. On the other hand, the rear camera unit 225 may operate with a relatively higher pixels (higher resolution) such that it can be useful for a user to obtain higher quality pictures for later use. The front camera unit 216 and the rear camera unit 225 may be installed at the body so as to rotate or pop-up.

A flash 224 is disposed close to the rear camera unit 225. The flash 224 operates in conjunction with the rear camera unit 225 when taking a picture using the rear camera unit 225. A mirror 226 may be disposed close to the flash 224. The mirror 226 can cooperate with the rear camera unit 225 to allow a user to photograph himself in a self-portrait mode.

Further, the power supply unit 222 is configured to supply power to the mobile terminal 200. The power supply unit 222 may be mounted in the body, or may be detachably mounted to the body.

A second audio output unit may also be disposed on the rear surface of the body. The second audio output unit disposed on the rear surface of the body may then implement a stereo function, together with the first audio output unit 211. In addition, the second audio output unit may be configured to operate as a speakerphone during a call.

Referring to FIG. 2 again, the audio input unit 213 disposed on the side surface of the mobile terminal may be implemented as a microphone, so as to receive a user's voice, other sounds, etc.

Further, the interface unit 270 may serve as a path through which the mobile terminal 200 of the present invention performs data exchange, etc. with an external device. For instance, the interface unit 270 may include at least one of a wired/wireless earphone port, short-range communication ports (e.g., IrDA port, Bluetooth port, wireless LAN port, etc.), and power supply terminals for supplying power to the mobile terminal 200. The interface unit 270 may be configured as a card socket for, for example, a subscriber identification module (SIM) card or a user identity module (UIM) card, a memory card, etc.

The user input unit 230 is configured to input a command for controlling the operation of the mobile terminal 200. For instance, the user input unit 230 may be implemented as a dome switch or a touch screen, or a touch pad for receiving a command or information by a user's push or touch operation. Alternatively, the user input unit 230 may be implemented as a wheel for rotating a key, or a jog wheel or a jog switch.

Commands input through the user input unit 230 may be variously set. For instance, the user input unit 230 is configured to input commands such as START, END and SCROLL. Further, the display unit 251 configured as the touch screen may be an example of the user input unit 230.

As shown in FIG. 2, the user input unit 230 may include a side manipulating unit 232 disposed on the side surface of the mobile terminal. The side manipulating unit 232 may be implemented as any one which can be operated by a user in a tactile manner.

Commands input by the side manipulating unit 232 may be set in various manners. For instance, commands may be input through the side manipulating unit 232. Here, the commands may include a command instructing control of the front camera unit 216 and the rear camera unit 225, a command controlling the sounds output from the audio output units, a command instructing state conversion of the display unit 251 to a touch recognition mode, etc.

Further, the user input unit 230 includes a touch manipulation unit 231 disposed at one side of the display unit 251 on the front surface of the terminal body, and is configured to sense a touch input of a specific key. Icons corresponding to the specific key are formed at the touch manipulation unit 231. In addition, at least one of the icons may be formed by an image module 240 (refer to FIG. 5) mounted in the mobile terminal, the image module providing an image exposed to the outside of the mobile terminal. More specifically, referring to FIG. 2, at least one touch key of the touch manipulation unit 231 is configured so that a shape line of an icon 231c can be disposed within a hair line region 231d having a metallic texture. The shape line may be formed to have a metallic texture, and may be configured to be illuminated.

Hereinafter, structures of the touch manipulation unit 231 and the image module 240 will be explained in more detail. In particular, FIG. 4 is an exploded view of the mobile terminal of FIG. 2, FIG. 5 is a rear exploded view associated with a touch manipulation unit of the mobile terminal of FIG. 4, and FIG. 6 is a sectional view taken along line 'VI-VI' in FIG. 2.

Figure 4:
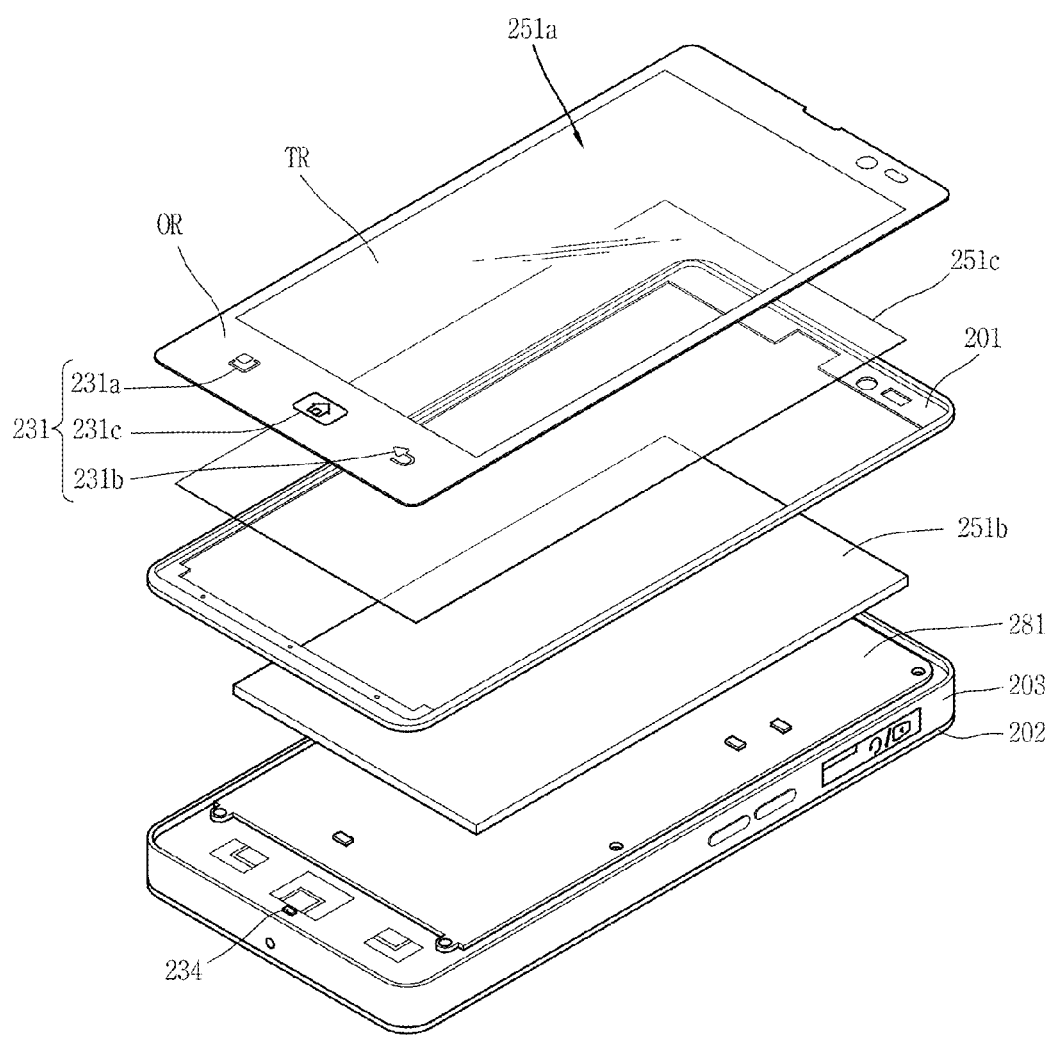
FIG. 4 is an exploded view of the mobile terminal of FIG. 2.
Figure 5:
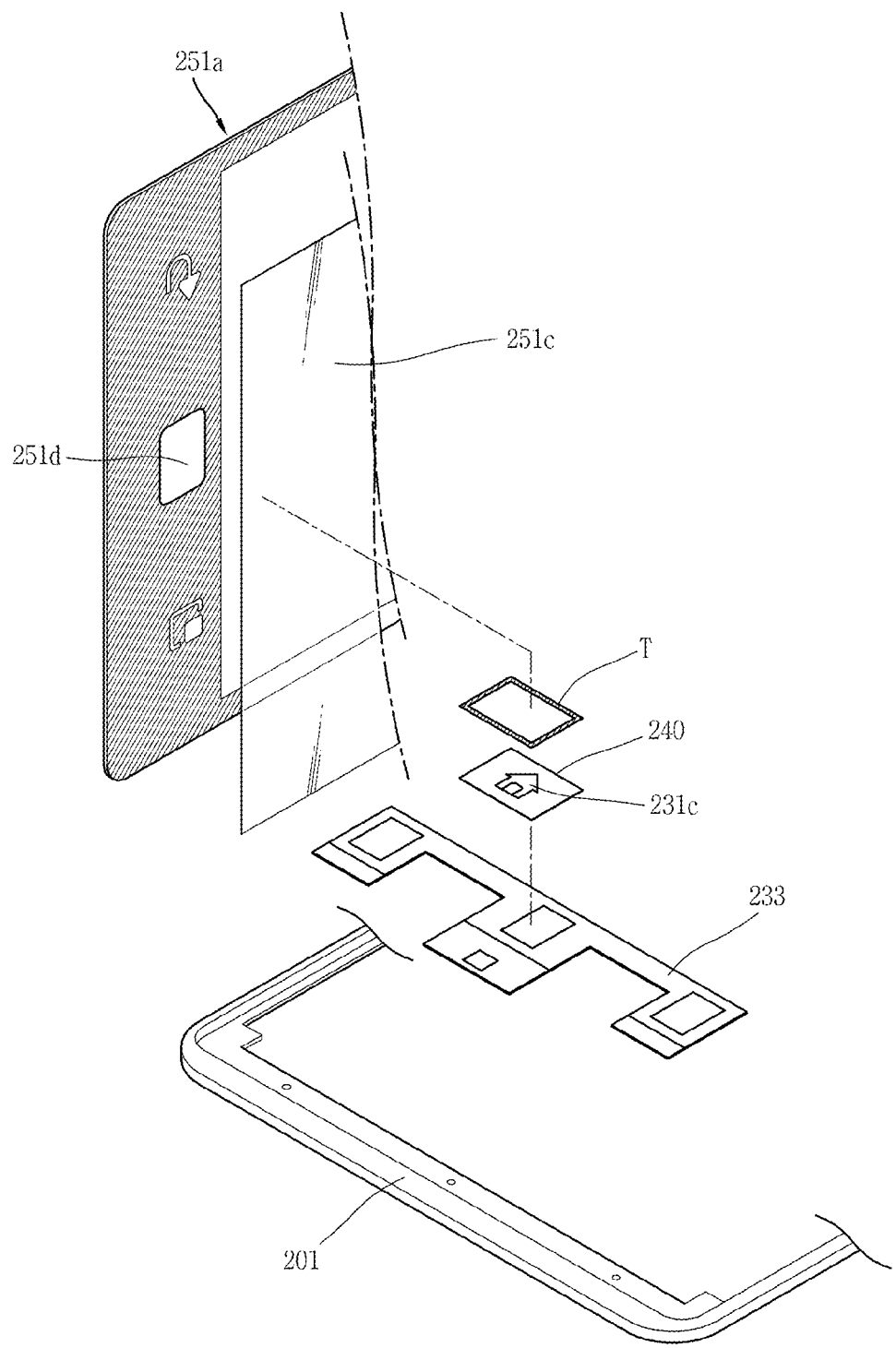
FIG. 5 is a rear exploded view associated with a touch manipulation unit of the mobile terminal of FIG. 4.
Figure 6:
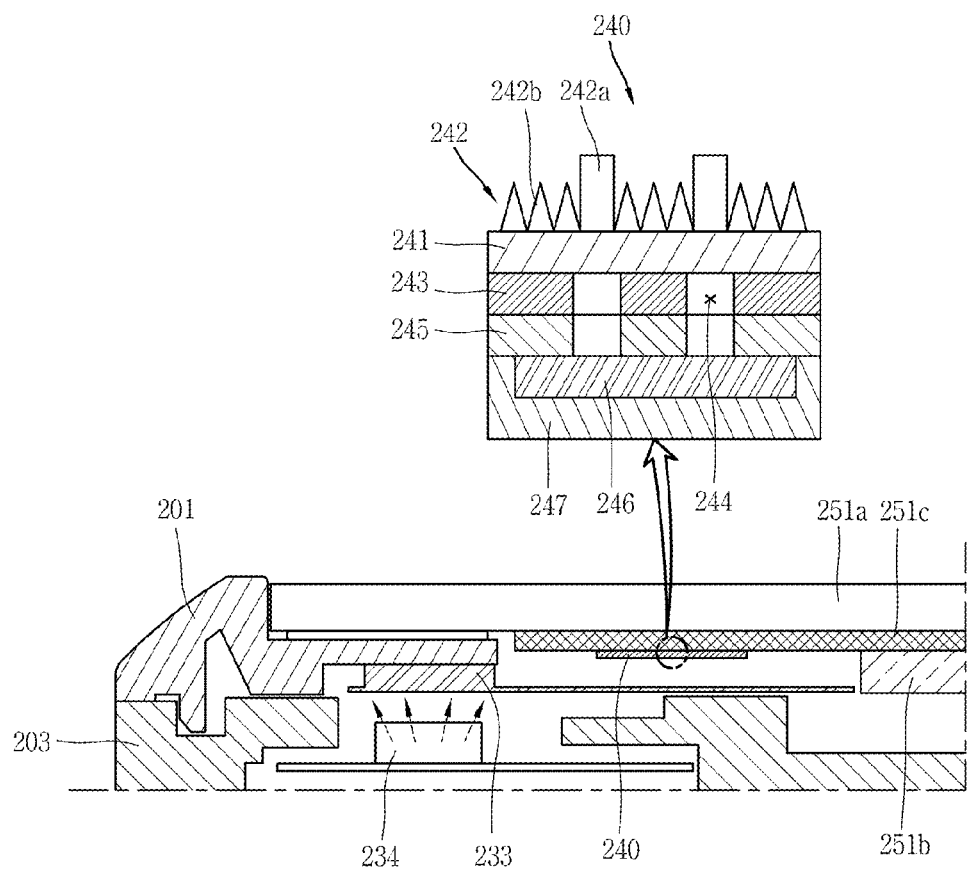
FIG. 6 is a sectional view taken along line 'VI-VI' in FIG. 2.

Referring to FIGS. 4 to 6, the middle frame 203 is formed between the front case 201 and the rear case 202. The middle frame 203 may be formed in a separate or integrated manner from/with the front case 201. A display 251b and a printed circuit board (PCB) 281 are formed above the middle frame 203. Alternatively, the PCB 281 may be formed below the middle frame 203 thus to be connected to the display 251b.

A window 251a is coupled to the front case 201 so as to cover one surface of the front case 201. Part of the window 251a, which corresponds to the display 251b, is implemented as a transparent region (TR), so that visual information output from the display 251b can be recognized from the outside. The display 251b and the window 251a constitute the display unit 251 (refer to FIG. 2).

The window 251a may have an area corresponding to the display unit 251, and may be formed of light transmissive material. An opaque region which allows light not to pass therethrough, or allows light to pass therethrough with a small penetration ratio, may be formed at the window 251a. For instance, the window 251a may undergo surface processing so that light cannot penetrate the edge of the window 251a. For example, part of a lower end of the window 251a where the touch manipulation unit 231 is disposed, is implemented as an opaque region (OR).

A touch sensor 251c configured to sense a touch input is mounted to the window 251a. The touch sensor 251c may be implemented as a capacitance-type transmissive touch film, and the transmissive touch film may be mounted to a rear surface of the window 251a. The transmissive touch film implemented as a touch pattern is formed on a transmissive film, which may be an ITO film.

More specifically, the PCB 281 may be connected to the touch sensor 251c, thus to sense a change of capacitance or charge amount generated from the inside of the window 251a when a user touches the window 251a. The PCB 281 may be implemented as an example of a controller for executing each type of functions of the mobile terminal.

Referring to FIGS. 4 to 6, the touch manipulation unit 231 is formed at the window 251a. In this example, the touch manipulation unit 231 is disposed close to one end of the window 251a. However, the present invention is not limited to this. That is, the touch manipulation unit 231 may be separately formed from the window 251a, and may be mounted to the front case 201.

More specifically, on the front surface of the mobile terminal, a transmissive region 251d is formed within the opaque region (OR) of the window 251a, separately from the transparent region (TR) corresponding to the display unit 251. Icons 231a and 231b of the touch manipulation unit 231 are disposed at both sides of the transmissive region 251d, and are printed onto a rear surface of the window 251a.

A lighting guide film 233 is mounted to the window 251a so as to cover the touch manipulation unit 231. Further, an optical source 234 is disposed to provide light towards the lighting guide film 233. The lighting guide film 233 guides the light towards the icons 231a and 231b. The optical source 234 may be implemented as a light emitting diode (LED), etc. and is mounted to the middle frame 203. Under such configurations, the icons 231a and 231b can be illuminated.

As shown, the icon 231c is formed on the transmissive region 251d, in a different manner from the icons 231a and 231b disposed at both sides of the transmissive region 251d. The transmissive region 251d may have a size corresponding to the hair line region 231d (refer to FIG. 2). The icon 231c may be exposed to the front surface of the window, and may correspond to a home key from a functional perspective. However, the present invention is not limited to this. That is, the icon 231c may be formed at any position, and may correspond to another key.

In this embodiment, the icon 231c is separately implemented from the two icons 231a and 231b by the image module 240. For instance, the image module 240 is mounted in the terminal body, such that at least part thereof can be exposed to the outside through the transmissive region 251d. That is, the touch sensor 251c and the image module 240 are sequentially disposed on the window 251a.

More specifically, the image module 240 overlaps the touch sensor 251c and the window 251a, and is mounted to the transmissive touch film by a silicone double-sided tape (T). Further, the image module 240 is covered by the lighting guide film 233. Under such configurations, images implemented by the image module 240 are illuminated by light on the front surface of the mobile terminal, which forms an icon associated with a touch input.

Hereinafter, the image module will be explained in more detail. Referring to FIG. 6, the image module 240 includes a base member 241, a first layer 242, a second layer 243 and image holes 244. The base member 241 may be implemented as a sheet, a film, a window, etc. formed of light transmissive material. As an example, the base member 241 may be formed of polyethylene terephthalate (PET), polycarbonate (PC), glass, etc.

The first layer 242 protrudes from one surface of the base member 241, so as to provide images 242a exposed to the outside of the mobile terminal through the transmissive region 251d (refer to FIG. 4). More specifically, light transmissive material is disposed on one surface of the base member 241 along the images 242a. That is, the images 242a are formed on one surface of the base member 241 in three dimensions, thereby forming a shape line of the icon 231c (refer to FIG. 4).

If the images 242a are entirely formed in a concave or convex shape, light passing through a lower end of the image module 240 towards an upper end is scattered or refracted, thereby providing a unique 3D effect to the images 242a.

In addition, the images 242a are formed of the light transmissive material in a 3D manner, by using at least one of UV molding, silicone molding, NCVM (Non-Conductive Vacuum Metallization), multi-evaporation, gas phase deposition and digital printing. In case of the UV molding, the light transmissive material may be UV curable material, and the shape of the UV curable material may be set by a mould which covers one surface of the base member 241 during molding.

As shown, the first layer 242 may include patterns 242b protruding from one surface of the base member 241, and formed of light transmissive material in a different shape from that of the images 242a. Like the images 242a, the patterns 242b are also formed in three dimensions in such protruding manner.

The images 242a are disposed within a region defined by the patterns 242b. The patterns 242b may be a plurality of protrusion lines, which implement a pattern such as hair lines as the protrusion lines are repeatedly formed in parallel to each other.

Under such configurations, the touch manipulation unit is formed so that a shape line of an icon implemented by the images 242a can be disposed within the hair line region 231d (refer to FIG. 2) formed by the transparent patterns 242b. That is, the patterns 242b are formed to fill other parts of the transmissive region 251d, rather than the shape line. However, the present invention is not limited to this. That is, the inside of the shape line may not be filled with the patterns 242b. In this instance, the images 242a are not expressed just by the shape line, but has the inside of the shape line filled.

Further, the patterns 242b and the images 242a are formed of the same material. As an example, the patterns 242b and the images 242a are simultaneously formed by UV molding using UV curable material. However, the present invention is not limited to this. That is, the formed patterns 242b may be removed if necessary. In addition, the patterns 242b and the images 242a are formed to have a height different in a thickness direction of the image module 240.

The second layer 243 is configured to cover another surface of the base member 241, and is formed of opaque material. More specifically, the second layer 243 may overlap the first layer 242 so as to cover the patterns 242b. For instance, the second layer 243 may be formed of metallic material or mirror ink, so that light incident through one surface of the base member 241 can be reflected. More specifically, the second layer 243 formed of a tin material is evaporated onto the base member 241, which provides a metallic texture to the patterns 242b.

The image holes 244 are formed by removing parts corresponding to the images 242a from the second layer 243, so that light which is towards another surface of the base member 241 can illuminate the images 242a through the base member 241. Under such configurations, the images 242a and the patterns 242b are combined with each other to form an icon, and light illuminates a shape line of the icon implemented by the images 242a. The patterns 242b are formed on metallic regions through which light is reflected.

As shown, the image holes 244 are formed by etching the second layer 243. A print layer 245 may be formed on one surface of the second layer 243, except for parts corresponding to the images 242a, so that the shape of the image holes 244 can be implemented by etching.

A texture or a color may be provided to the images 242a. To this end, a third layer 246 having the texture or the color is configured to cover the second layer 243. Also, the images 242a may be formed to have a metallic texture and a color. For instance, the third layer 246 includes a metallic material so that the images 242a can have a metallic texture. The metallic material is formed to be transmissive so that the images 242a can be illuminated. For instance, the third layer 246 may be formed of a tin material having a different amount from that of the second layer 243.

As shown, a protection layer 247 may be formed on one surface of the third layer 246, for prevention of separation of the third layer 246. The protection layer 247 may also be printed on the rear surface of the third layer 246 for enhanced reliability.

Under such configurations, one or more metallic images which can be illuminated may be implemented on a metallic region of the mobile terminal. In the present invention, another material rather than a metallic material can be used. For instance, an icon of a different design from that of the related art may be implemented by combining mirror ink, print ink, metallic material, etc. with one another.

Hereinafter, a method for manufacturing the image module will be explained. FIGS. 7A to 7I are conceptual views illustrating a method for manufacturing an image module according to an embodiment of the present invention.

Figure 7A:
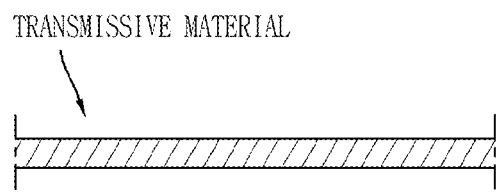
FIGS. 7A to 7I are conceptual views illustrating a method for manufacturing an image module according to an embodiment of the present invention.
Figure 7B:
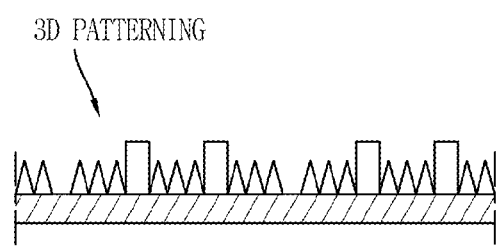

Referring to FIGS. 7A and 7B, a first layer is disposed on one surface of a base member, and is formed of transmissive material so as to form transmissive images. The images may be formed on one surface of the base member, by using at least one of UV molding, NCVM (Non-Conductive Vacuum Metallization), multi-evaporation, gas phase deposition and digital printing.

In case of the UV molding, the step of forming the first layer may be a step of forming patterns formed of light transmissive material and having a different shape from that of the images, together with the images by the UV molding. In this case, the light transmissive material is UV curable material, and the UV curable material is applied to one surface of the base member. Then, the UV curable material is hardened by UV irradiation, while being accommodated in a mould which covers said one surface.

The base member may be cut from a transmissive material. More specifically, the transmissive material may be implemented as a wide sheet, a wide film, and so on, such that it can be divided into a plurality of base members. The first layer is molded such that images can be repeatedly formed on the transmissive material.

Figure 7C:
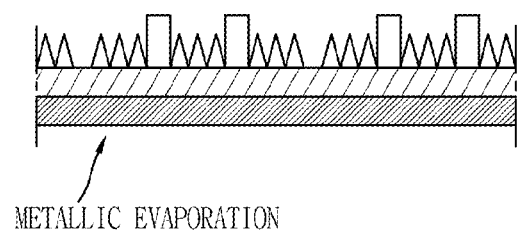
Figure 7D:
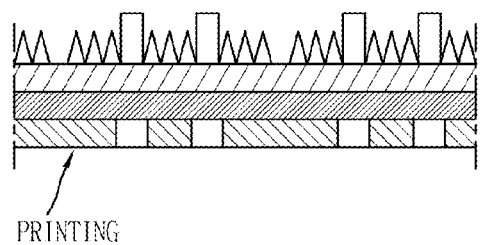
Figure 7E:
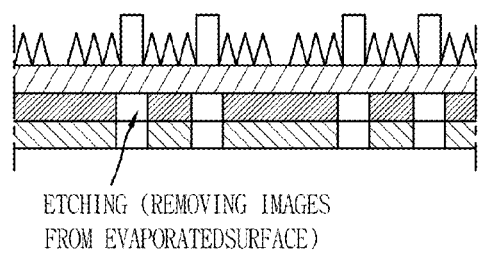

Next, a second layer formed of opaque material is formed on another surface of the base member (refer to FIG. 7C). The step of forming the second layer may be a step of coating or evaporating metallic material, or of applying mirror ink onto another surface of the base member. The mirror ink may be applied by evaporation (or gas phase deposition), spray, etc. The metallic material may be implemented as tin material, and may be formed by NCVM (Non-Conductive Vacuum Metallization), multi-evaporation, gas phase deposition, etc.

Next, parts corresponding to the images are removed from the second layer, such that light which is towards the other surface can illuminate the images through the base member. The removing step includes a printing step (refer to FIG. 7D) and an etching step (refer to FIG. 7E).

The printing step may be a step of printing a print layer onto the second layer, the print layer formed on the second layer 243 except for parts corresponding to the images. The parts corresponding to the images may be picto, etc., which may be implemented by patterning. The etching step may be a step of etching parts corresponding to the images from the second layer, using at least one of photo-etching, chemical etching and laser etching.

Figure 7F:
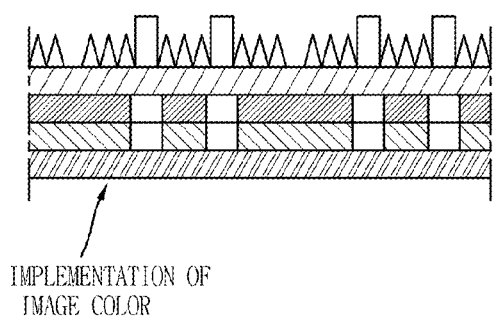
Figure 7G:
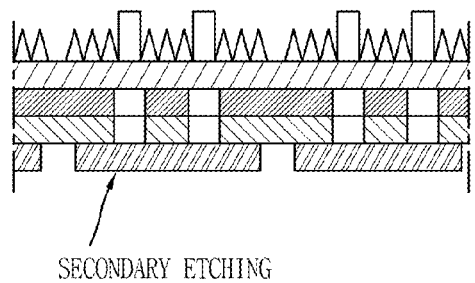

Next, a third layer disposed to cover the second layer is formed, such that the images can have a texture or a color (refer to FIG. 7F). The third layer may be formed by NCVM (Non-Conductive Vacuum Metallization), gas phase deposition, or multi-evaporation, and may be formed to be transparent or semi-transparent. The third layer may undergo secondary etching (refer to FIG. 7G). This may allow the peripheral parts of an icon to be removed.

Figure 7H:
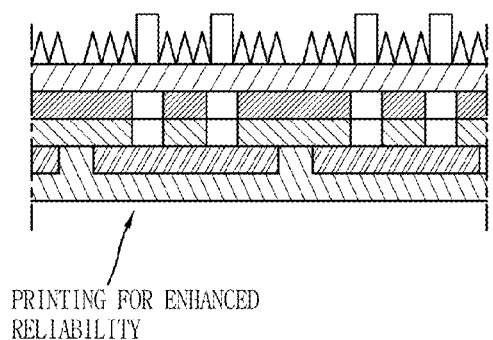

Referring to FIG. 7H, a protection layer is printed onto one surface of the third layer, for prevention of separation of the third layer. However, the present invention is not limited to this. That is, secondary etching or protection layer printing may not be performed in the present invention.

Figure 7I:
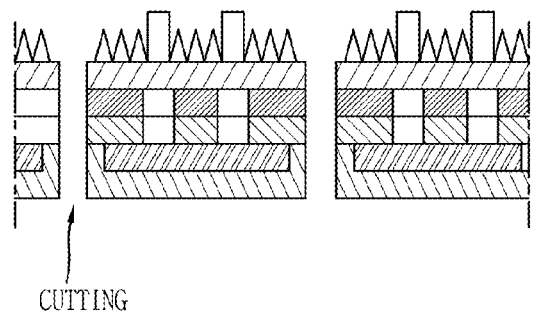

Finally, the image module is cut from the transmissive material (refer to FIG. 7I). The cutting may be performed through NC processing. Before the cutting step, the first layer may be laminated for protection of the image module. Also, a punching process for punching parts to be cut may be additionally performed for facilitation of the cutting. The image module manufactured by the above method may be modified in various manners.

Hereinafter, a mobile terminal having the image module will be explained with reference to FIG. 8A to FIG. 11. The same or similar configurations of other embodiments of the mobile terminal according to the present invention, as/to the configuration of the aforementioned embodiment will not be explained.

Figure 8A:
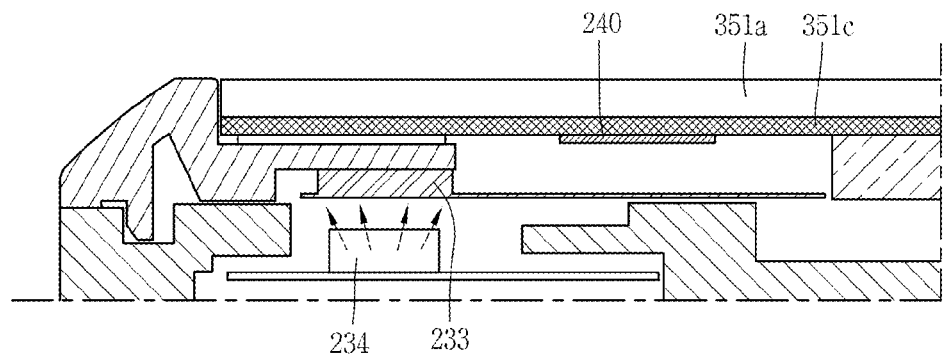
FIGS. 8A to 8D are conceptual views illustrating other embodiments of a mobile terminal according to an embodiment of the present invention.

FIGS. 8A to 8D are conceptual views illustrating other embodiments of the mobile terminal according to the present invention. Referring to FIG. 8A, a touch sensor 351c includes touch sensing patterns formed on a window 351a. That is, the window 351a includes a plurality of layers, and touch sensing patterns are formed at the layers. More specifically, touch sensing patterns are directly formed on the surface of window glass, and then are covered with glass or a film, etc. In this instance, the touch sensing patterns may be divided into a touch point sensing region (which corresponds to a display unit), and a region which senses whether touch has been performed or not. An image module 240 is attached to the rear surface of the window 351a (glass or film), so as to overlap the region which senses whether touch has been performed or not.

Figure 8B:
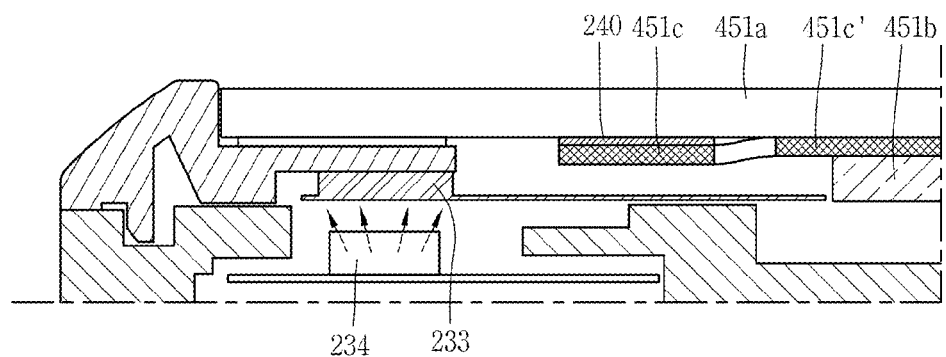

Referring to FIG. 8B, the image module 240 is disposed between a window 451a and a touch sensor 451c. In this instance, the touch sensor 451c includes a transmissive touch film, the image module 240 is mounted to the rear surface of the window 451a, and the transmissive touch film is attached to the rear surface of the image module 240.

In this instance, the touch sensor 451c may be separately provided from a touch sensor 451c' corresponding to the display unit. The touch sensor 451c' corresponding to the display unit is directly attached to the window 451, thereby having a height difference from the touch sensor 451c overlapping the image module 240, in a thickness direction of the mobile terminal. A display 451b is also shown in FIG. 8B.

Figure 8C:
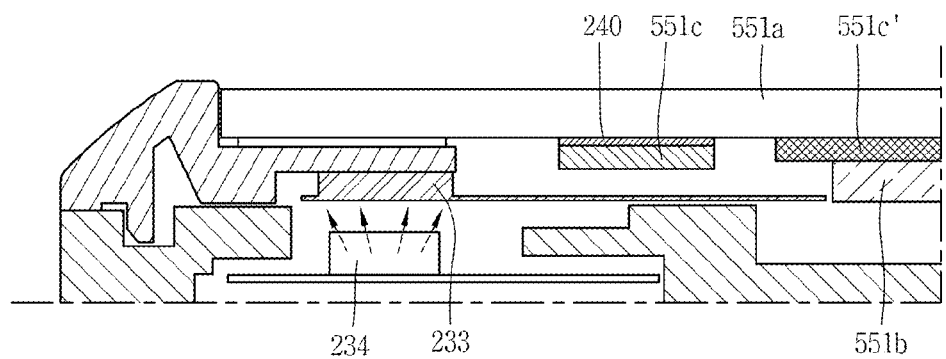

Referring to FIG. 8C, a touch sensor 551c is formed of opaque material, and the image module 240 is disposed between a window 551a and the touch sensor 551c. The touch sensor 551c is implemented as a touch sensing region is formed on a printed circuit board. Further, the touch sensor 551c is configured to sense whether the touch sensing region has been touched or not, not to sense a touched point. Under such configuration, whether a part corresponding to the icon 231c (refer to FIG. 2) has been touched or not can be rapidly sensed. A display 551b and corresponding touch sensor 551c are also shown in FIG. 8C.

Figure 8D:
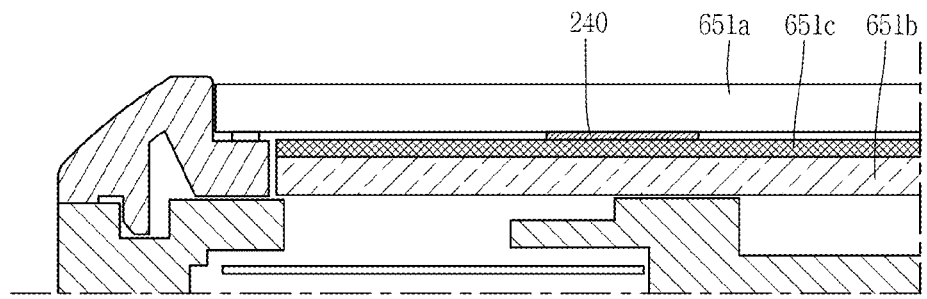

Referring to FIG. 8D, the image module 240 is mounted to the rear surface of a window 651a, and a touch sensor 651c is formed on the surface of a display 651b covered by the window 651a.

The touch sensor 651c may be divided into a touch point sensing region, and a region which senses whether touch has been performed or not. The touch point sensing region forms a touch screen together with the display 651b, and the region which senses whether touch has been performed or not forms a touch manipulating unit together with the image module 240. Under such configurations, the window 651a, the image module 240, the touch sensor 651c and the display 651b are sequentially formed, and an additional optical source is not required since the display 651b serves as an optical source.

So far, it has been explained about many embodiments where the image module 240 of FIG. 6 is combined with peripheral electronic devices. Hereinafter, structural modifications of the image module 240 will be explained.

Figure 9A:
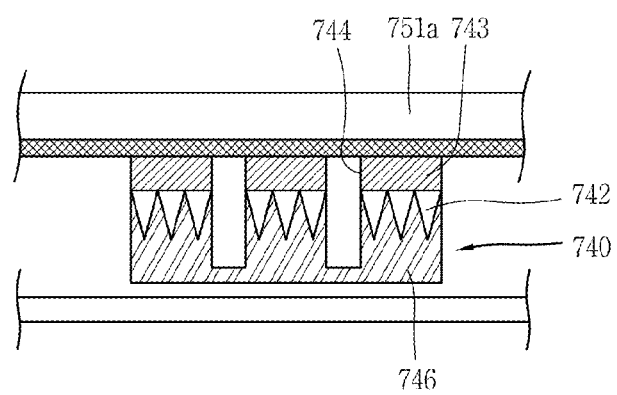
FIGS. 9A and 9B are sectional views illustrating still another embodiment of a mobile terminal according to an embodiment of the present invention.
Figure 9B:
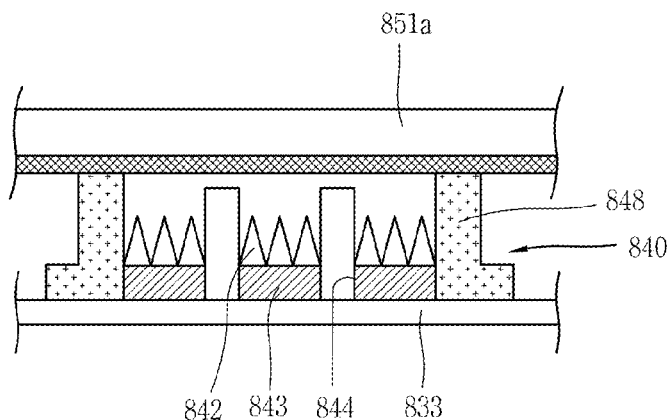

FIGS. 9A and 9B are sectional views illustrating still another embodiment of a mobile terminal according to the present invention. Referring to FIG. 9A, an image module 740 includes a first layer 742 and a second layer 743. As shown, a window 751a serves as a base member, the second layer 743 is formed on the rear surface of the window 751a, and the first layer 742 is formed on the second layer 743. Once the first layer 742 is formed by UV molding, UV curable material fills image holes 744 of the second layer 743. The second layer 743 may be formed of light transmissive material, such that patterns formed by the UV curable material can be exposed to the outside.

As shown, a third layer 746 overlaps the first layer 742 on the rear surface of the window, and provides a texture or a color to images of the image module through the image holes 744. In this instance, the third layer 746 may be formed of opaque material.

Referring to FIG. 9B, an image module 840 may be integrated with a lighting guide film 833 mounted in a terminal body, such that light from an optical source can be reflected to images. As an example, a first layer 842 and a second layer 843 are disposed on one surface of the lighting guide film 833, and face a window 851a.

The second layer 843 may be firstly printed on one surface of the lighting guide film, and then image holes 844 may be etched. Next, the first layer 842 is formed on the second layer 843. If the first layer 842 is formed by UV molding, the image holes 844 are filled with UV curable material.

As shown, the first layer 842 and the window 851a may be formed so that at least parts thereof are spaced from each other by a prescribed gap. An adhesion layer 848 configured to adhere the first layer 842 and the window 851a to each other, with filling the gap, may be disposed between the first layer 842 and the window 851a. The adhesion layer 848 may be implemented as a silicone tape, etc., which may prevent moisture from being introduced into the gap.

So far, it has been explained where an icon is implemented on the touch manipulation unit. However, the present invention is not limited to this. Hereinafter, will be explained an embodiment where a logo, etc. are formed on the mobile terminal by the image module.

Figure 10:
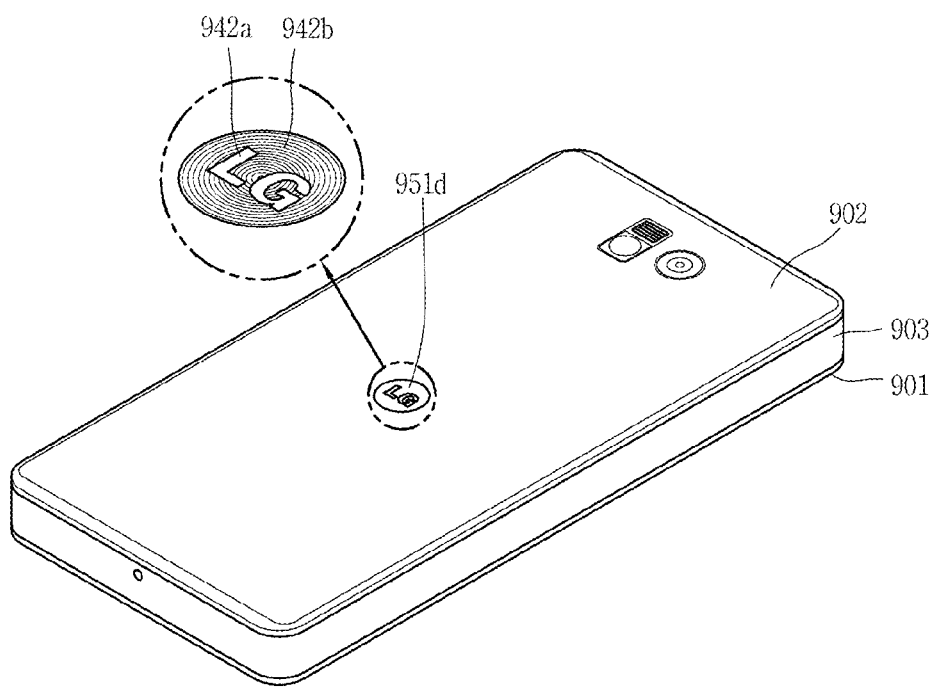
FIGS. 10 and 11 are respectively a rear sectional view and a side sectional view of a mobile terminal according to another embodiment of the present invention.
Figure 11:
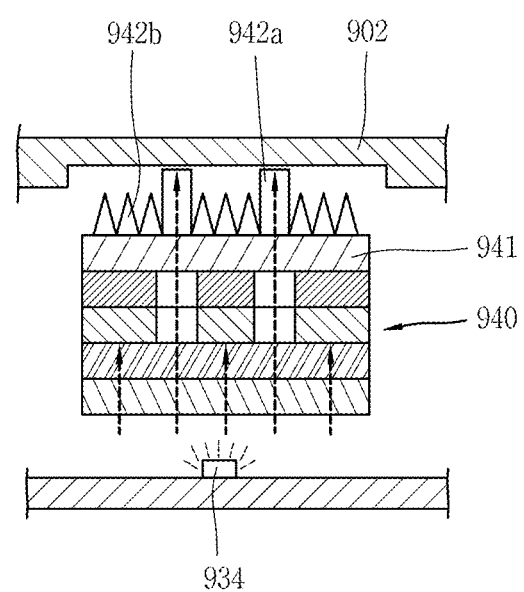

In particular, FIGS. 10 and 11 are respectively a rear sectional view and a side sectional view of a mobile terminal according to another embodiment of the present invention. Referring to FIGS. 10 and 11, a transmissive region 951d is formed on the rear surface of a terminal body. In this instance, the mobile terminal may have a fixed type battery, not a detachable type battery. Also, a rear case 902 may not be covered by a battery cover. Therefore, the transmissive region 951d is formed on an outer surface of the rear case 902. A front case 901 and middle case 903 are also shown.

An image module 940 is mounted to an inner surface of the rear case 902. The image module is formed so that images 942a can be exposed to the outside through the transmissive region 951d. The images may implement logos disposed on the rear surface of the mobile terminal. However, the present invention is not limited to this. That is, the logos may be formed on the front surface of the mobile terminal, e.g., on a front case or a window.

For instance, the images 942a are formed on a base member 941 of the image module 940 in three dimensions, thereby implementing logos. The logos are formed so as to be illuminated by light. To this end, an optical source 934 for providing light towards the image module 940 is mounted in the mobile terminal. The optical source 934 is disposed to overlap the base member 941 in a thickness direction of the mobile terminal, which enables a structure requiring no additional lighting guide film.

The optical source 934 may be controlled according to a state change of the mobile terminal. For instance, the optical source 934 may interwork with a touch manipulation unit (not shown) disposed on the front surface of the mobile terminal. In this case, the touch manipulation unit may be provided with only icons printed on the rear surface of the window. A lighting structure near the icons may be the same as that of the aforementioned embodiment.

As an example of the interwork, if a non-activated state of a display of the mobile terminal is converted to an activated state by input of a control command, the icons and logos can be together illuminated. If the image module is applied to implement a logo, the image module needs not overlap a touch sensor for sensing touch. Furthermore, a lighting function may not be required. In this case, a logo can be implemented as metallic images are formed on a metallic region of the mobile terminal.

The present invention thus has the following advantages.

Firstly, transmissive images are disposed on one surface of the base member and etched opaque layers are formed on another surface of the base member. This allows images which can be illuminated to be implemented on a metallic region.

Secondly, as transmissive patterns are formed near the transmissive images, images which can be illuminated are disposed within a metallic hair line region.

Thirdly, as the images can have a metallic texture by the third layer disposed to cover the second layer, a touch icon or logo implemented by the images can be formed on a metallic region.

Fourthly, the first layer is formed on one surface of the base member, the second layer is formed on another surface of the base member, and parts corresponding to the images are removed from the second layer. This allows the image module to be efficiently manufactured.

Fifthly, transmissive images and patterns are formed on the same layer, and the patterns are covered with opaque material whereas the images are not covered with the opaque material. This implements a logo or icon which can be illuminated on a metallic region of the mobile terminal.

Sixthly, since 3D images formed by UV molding are formed to have different colors by different materials, images or patterns different from those of the related art are provided.

Seventhly, since the image module is implemented by molding, the image module can be modified and applied in various manners.

Eighthly, the image module can be easily attached to the window, etc., and can be integrated with the window, the ITO film, the lighting guide film, etc.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a terminal body having a front surface and a rear surface;
a transmissive region formed on at least one of the front surface and the rear surface;
an image module mounted in the terminal body; and
an optical source configured to transmit light towards the image module, wherein the image module includes:
a base member including a light transmissive material;
a first layer having a first protruding pattern protruding from a first surface of the base member, wherein the first protruding pattern is visually exposed to an outside;
a second layer including an opaque material and covering a second surface of the base member, wherein the first and second surfaces of the base member are on opposite sides of the base member;
one or more image through-holes in the second layer and configured to pass light from a light source through the one or more image through-holes to the protruding pattern to illuminate and present one or more images with the first protruding pattern; and
a third layer disposed on the second layer, wherein at least a portion of the third layer overlaps the one or more image through-holes, wherein the at least the portion of the third layer is exposed toward the first layer through the one or more image through-holes and the base member, wherein the second layer is exposed toward the first layer through the base member, and
wherein the one or more images are formed by a combination of the first layer, the second layer and the third layer.

2. The mobile terminal of claim 1, further comprising:
a touch sensor overlapping the image module and configured to sense a touch input, wherein the one or more images are illuminated on the front surface of the terminal body, and form an icon associated with the touch input.

3. The mobile terminal of claim 1, wherein the one or more images form a logo illuminated by the transmitted light on at least one of the front and rear surfaces.

4. The mobile terminal of claim 1, wherein the first protruding pattern includes a first portion that overlaps with the one or more image through-holes and a second portion that does not overlap with the one or more image through-holes.

5. The mobile terminal of claim 4, wherein the first portion has a different height than the second portion in a thickness direction of the image module.

6. The mobile terminal of claim 4, wherein the first portion has a different height than the second portion.

7. The mobile terminal of claim 4, wherein the first portion has a different surface texture than the second portion.

8. The mobile terminal of claim 4, wherein the second portion is formed on a metallic region through which light is reflected.

\* \* \* \* \*